United States Patent [19]

Takayama

[11] 4,374,345
[45] Feb. 15, 1983

[54] ELECTRONIC FLASH APPARATUS

[75] Inventor: Syuichi Takayama, Hachioji, Japan

[73] Assignee: Olympus Optical Co., Ltd., Tokyo, Japan

[21] Appl. No.: 237,940

[22] Filed: Feb. 25, 1981

[30] Foreign Application Priority Data

Feb. 29, 1980 [JP] Japan ................................. 55-24781

[51] Int. Cl.³ .......................................... H05B 41/32
[52] U.S. Cl. ............................. 315/241 P; 315/151; 320/1
[58] Field of Search .................. 315/151, 159, 241 R, 315/241 P; 320/1; 354/33, 60 F, 145

[56]  References Cited
U.S. PATENT DOCUMENTS

| 4,012,665 | 3/1977 | Nakamura et al. | 315/241 P |
| 4,075,536 | 2/1978 | Stevens | 315/241 P |
| 4,163,178 | 7/1979 | Hosono | 315/241 P |

FOREIGN PATENT DOCUMENTS 54-42192 12/1979 Japan .

*Primary Examiner*—Eugene R. LaRoche
*Attorney, Agent, or Firm*—Frishauf, Holtz, Goodman & Woodward

[57]  ABSTRACT

The voltage on an electronic flash tube or a main capacitor is detected by a voltage detecting circuit, and when the detected voltage reaches the discharge continuous voltage of the flash tube, a power source circuit is disconnected for a predetermined period of time.

7 Claims, 8 Drawing Figures

ELECTRONIC FLASH APPARATUS

BACKGROUND OF THE INVENTION

This invention relates to electronic flash apparatus and, more particularly, to electronic flash apparatus provided with means for preventing continuous discharge of a flash tube.

In the power supply circuit of an electronic flash apparatus, a continuous discharge prevention circuit for inhibiting continuous discharge of a flash tube with power continually supplied from the power supply circuit after its flashing is provided. With the prior art continuous discharge prevention circuit, however, a main capacitor discharging circuit is rendered open for a predetermined period of time every time the flash tube is actuated even when the flashing of the flash tube is interrupted by a quenching circuit. Therefore, while the continuous discharge prevention circuit is operative, the main capacitor is not charged even though the flashing has been interrupted by the quenching circuit, and thus the time until the completion of the charging of the main capacitor is extended that much.

An object of the invention, accordingly, is to provide a power supply circuit for electronic flash apparatus, which can reduce the time until the completion of charging of the main capacitor.

SUMMARY OF THE INVENTION

According to the invention, there is provided an electronic flash apparatus, which comprises an electronic flash tube, a main capacitor connected to the electronic flash tube, a power source connected through a switch circuit to the main capacitor, and means for detecting the voltage across the capacitor or flash tube and opening the switch circuit when a predetermined voltage near a discharge blocking voltage of the flash tube is detected.

This invention can be more fully understood from the following detailed description when taken in conjunction with the accompanying drawings:

DETAILED DESCRIPTION

Figure 1:
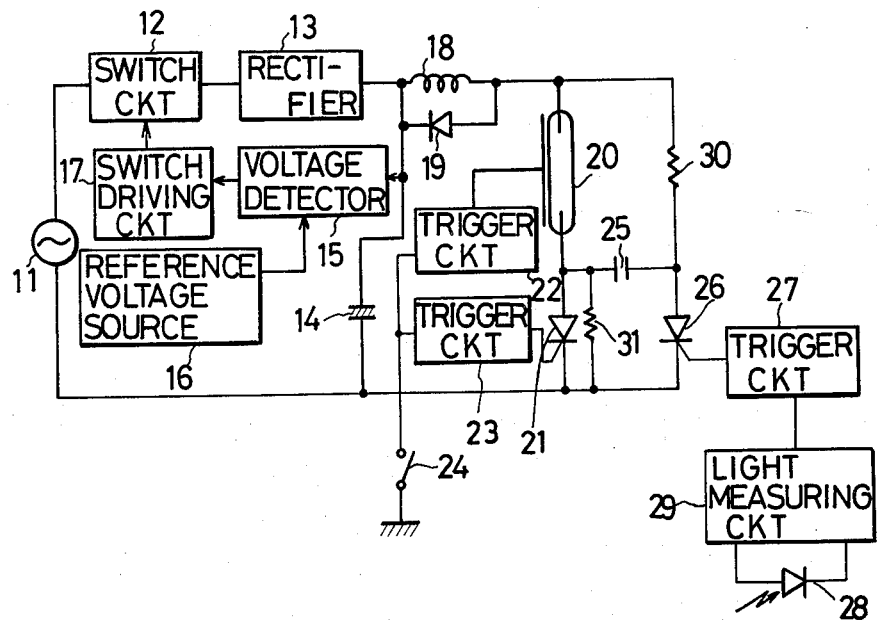
FIG. 1 is a circuit diagram showing an electronic flash apparatus including a power source circuit embodying the invention.

Referring now to FIG. 1, an AC power source 11 is connected through a switch circuit 12 and a rectifying circuit 13 to a main capacitor 14. A voltage detector 15 is connected to the main capacitor 14. A reference voltage source 16 is connected to the voltage detector 15, and the output terminal thereof is connected to a switch driving circuit 17. The switch driving circuit 17 has its output terminal connected to the switch circuit 12 for controlling this circuit. The main capacitor 14 is connected in parallel with a series circuit of a flash tube 20 and a main thyristor 21 via a parallel circuit of an inductor 18 and a diode 19. Trigger circuit 22 and 23 are respectively connected to the trigger electrode of the flash tube 20 and to the gate of the main thyristor 21. These trigger circuits 22 and 23 are adapted to produce a trigger signal in response to the operation of an X switch 24 of the camera. The main thyristor 21 has its anode connected through a quenching capacitor 25 and a quenching thyristor 26 to its cathode. A trigger circuit 27 is connected to the gate of the commutation thyristor 26. To the trigger circuit 27 is connected a light measuring circuit 29 for measuring the exposure from the photocurrent flowing from a light receiving element (photodiode) 28. The light measuring circuit 29 generally includes an integrating circuit for integrating the photocurrent signal and a comparator circuit for comparing the integral output of the integrating circuit and a reference signal. The juncture between the quenching capacitor 25 and anode of the quenching thyristor 26 is connected through a resistor 30 and the parallel circuit of inductor 18 and diode 19 to the rectifier 13. A resistor 31 is connected in parallel with the main thyristor 21.

Operation

In the circuit of FIG. 1, when the AC power source 11 is connected, the AC voltage thereof is supplied through the switch circuit 12 to the rectifier 13. The main capacitor 14 and quenching capacitor 25 are charged by the output of the rectifier 13. When a camera shutter release button is depressed after the charging is completed, the X switch is closed, causing the trigger circuits 22 and 23 to produce a trigger signal each. By these trigger signals the flash tube 20 and main thyristor 21 are triggered, whereby the flashing of the flash tube 20 is caused with the discharge of the main capacitor 14. The light flash thus emitted illuminates the foreground subject, and light reflected therefrom is received by the light receiving element 28. The light receiving element 28 thus generates photocurrent which is supplied to the light measuring circuit 29. The light measuring circuit 29 measures the exposure and, when the proper exposure is reached, actuates the trigger circuit 27. The trigger circuit 27 delivers, in response to the output of the light measuring circuit 29, a trigger signal to the quenching thyristor 26 to render the thyristor 26 conductive. Consequently, the voltage across the quenching capacitor 25 is impressed as reverse bias through the quenching thyristor 26 upon the main thyristor 21. As a result, the main thyristor 21 is rendered non-conductive to interrupt the flash radiation of the flash tube 20.

The voltage detector 15 detects the voltage across the main capacitor 14 and compares this detected voltage with a reference voltage of the reference voltage source 16. The reference voltage is set to a value in the neighborhood of the discharge continuous voltage of the flash tube 20, and when the voltage across the main capacitor 14 supplying the discharge energy to the flash tube 20 is reduced to the discharge continuous voltage of the flash tube 20, the voltage detector 15 generates an output signal. Thus, when the flash radiation of the flash tube 20 is forcibly terminated upon reaching of the proper exposure, the discharge of the main capacitor 14 is also discontinued, the voltage across the main capacitor 14 does not become lower than the discharge continuous voltage of the flash tube 20. Consequently, in this case the voltage detector 15 generates no output signal, so that the switch circuit 12 is not rendered non-conductive by the switch driving circuit 17. Thus, in this case the charging of the main capacitor 14 is started as soon as the flash radiation of the flash tube 20 is interrupted. In case the proper exposure is not reached, however, the flash radiation of the flash tube 20 is not forcibly terminated, so that the discharge of the main capacitor 14 is continued until its voltage is reduced to a value in the neighborhood of the discharge blocking voltage of the flash tube 20. When the voltage of the main capacitor 14 becomes lower than the discharge blocking voltage, the flash radiation of the flash tube 20 is ended. But, in the neighborhood of the discharge blocking voltage the flash tube 20 is switched to the state of continuous discharge by the output of the charging circuit constituted by the rectifier 13 and the switch circuit 12, because the charging circuit is so constructed as to offer a low impedance in order to provide for a short charging period. If the continous discharge is brought about, the charging for the next flash radiation cannot be obtained. In addition, the flash tube 20 is unnecessarily heated to a dangerous state. In order to avoid such a situation, the charging circuit may be opened when the voltage across the main capacitor 14 is brought to a value in the neighborhood of the discharge blocking voltage. According to the invention, the voltage detecting circuit 15 generates an output signal when it detects the reduction of the voltage across the main capacitor 14 to the neighborhood of the discharge blocking voltage, and in response to this output signal the switch driving circuit 17 renders the switch circuit 12 open for a predetermined period of time. With the power from the rectifier 13 cut off for this period of time, the main capacitor 14 is discharged to a voltage below the discharge blocking voltage, whereby the discharge of the flash tube 20 is ended, that is, the continuous discharge is prevented.

Figure 2:
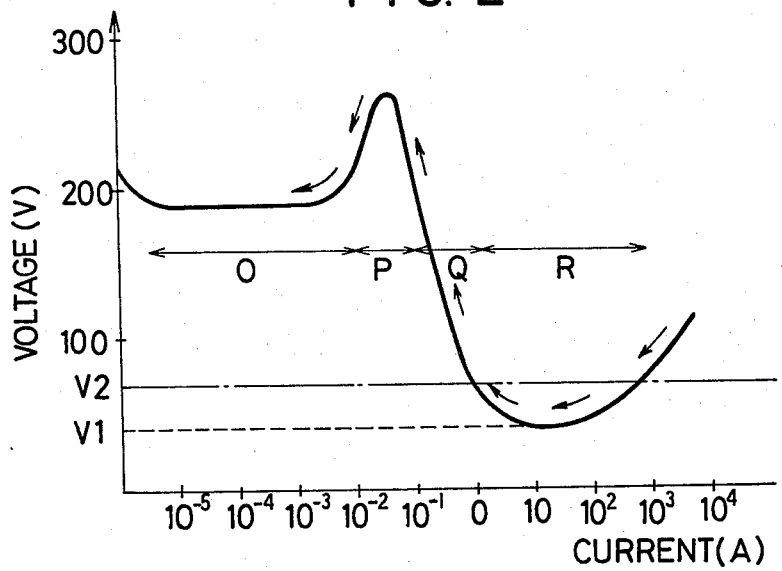
FIG. 2 is a graph showing the discharge characteristic of a flash tube.

FIG. 2 shows the discharge characteristic of the flash tube. When the flash tube is triggered, a current of several 100 amperes is immediately caused, and the discharge current is reduced to the discharge blocking voltage to discontinue the discharge after the lapse of several 10 microseconds to several milliseconds. With the discharge characteristic of FIG. 2, the voltage changes with the discharge current after the commencement of the discharge in the manner as shown by arrows. If the switch circuit 12 in the circuit of FIG. 1 is not opened before the reaching of the discharge blocking voltage $V_1$, the phenomenon of continuous discharge, i.e., discharge sustained by the rectified voltage obtained from the AC power source 11, takes place. According to the invention, the switch circuit 12 is opened in response to the detection of a voltage in the neighborhood of the discharge blocking voltage, so that the continuous discharge is never caused. In addition, since the switch circuit 12 is not opened at a voltage above $V_1$, the main capacitor 14 can be charged immediately after its discharge. In FIG. 2, labeled O is the glow discharge region, and labeled P,Q and R are the full flash region, attenuation region and arc discharge region respectively. In the arc discharge region R, the continuous discharge is brought about if the power source conditions permit it. It may be brought about in all the voltage versus current relations. The continuous discharge voltage takes various values depending upon the performance of the power source 11 and rectifier 13.

Now, the invention will be described in further detail with reference to FIG. 3. Referring to the Figure, the switch circuit 12 connected to the AC power source 11 is formed by a triac 12a, and the rectifier 13 is a triple voltage rectifier including rectifying elements 13a, 13b and 13c and capacitors 13d and 13e. The switch driving circuit 17 includes a trigger transistor 17a, a diode 17b connected between one end of the secondary winding of the trigger transformer and the gate of the triac 12b and a resistor 17c connected between the juncture between the anode of the diode and the other end of the secondary winding and the output terminal of the triac 12a.

The AC power source 11 is connected to a single-phase bridge rectifier 35. The positive output terminal of the rectifier 35 is connected through resistors 36 and 37 and a capacitor 38 to its negative output terminal. The juncture between the resistors 36 and 37 is connected through a resistor 39, a uni-junction transistor 40 and the primary winding of the trigger transformer 17a to the negative terminal of the rectifier 35. The AC power source 11 is connected through a diode 41 and a resistor 42 to a line 43 and also connected to a rectifier 47 formed by a diode 44, a resistor 45 and a capacitor 46. A series circuit of a capacitor 48, resistors 49 and 50 and a zener diode 51 is connected to the output side of the rectifier 47. The juncture between the resistor 45 and capacitor 48 is connected through a diode 52 to the main capacitor 14. A zener diode 54 and a capacitor 55 are connected in parallel between a line 53 connected to the AC power source 11 and the line 43. A zener diode 56 has its cathode connected to the non-inverted input terminal of an operational amplifier 58, and the juncture between the resistors 49 and 50 is connected through a resistor 49 to the inverted input terminal of the operational amplifier 58. The operational amplifier 58 has its output terminal connected through a resistor 60 to the base of a transistor 61. The transistor 61 has its collector connected through the LED of a photo-coupler 62 and a resistor 63 to the line 43 and its emitter connected to the line 53. The photo-transistor of the photo-coupler 62 is connected across a capacitor 38. A zener diode 64 is connected in parallel with a series circuit of capacitor 38 and resistor 37. The diode 51 has its cathode connected through a resistor 65 to the line 43.

Figure 4:
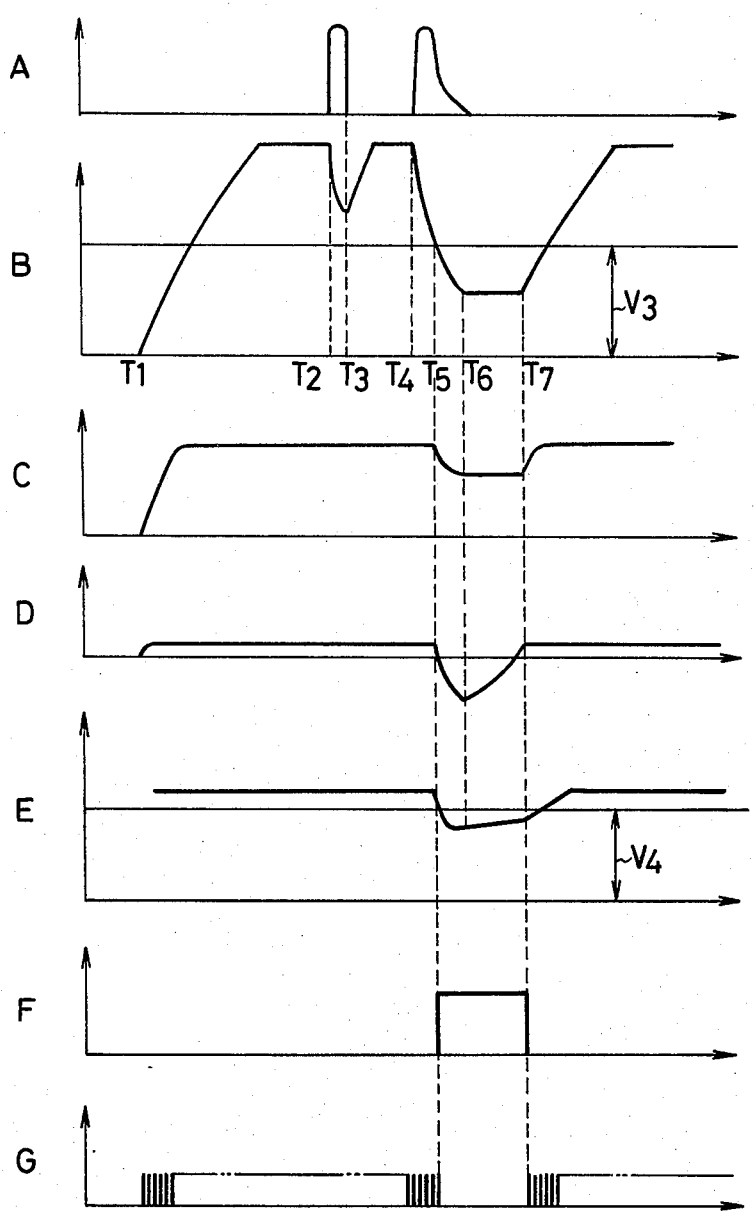
FIG. 4 is a waveform diagram showing waveforms appearing at various parts of the circuit of FIG. 3.

Now, the operation of the circuit 3 will be described with reference to a time chart shown in FIG. 4.

Figure 5:
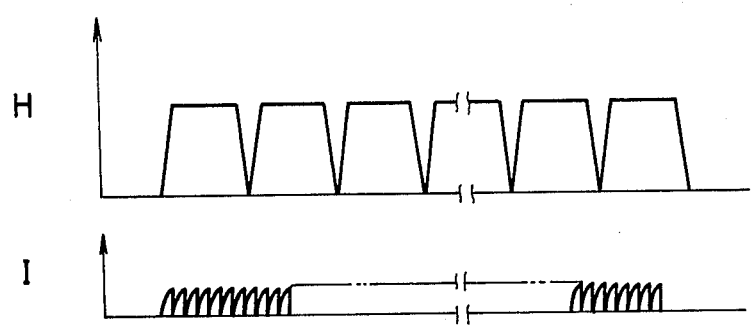
FIG. 5 is a waveform diagram showing waveforms appearing at other parts of the circuit of FIG. 3.

When the AC power source 11 is closed, the rectifier 35 provides the rectified voltage, which is converted by the action of the resistor 36 and zener diode 64 to a trapezoidal wave voltage as shown in FIG. 5. This trapezoidal wave voltage is coupled to an oscillator constituted by the resistor 37, capacitor 38, resistor 39 and uni-junction transistor 40. This oscillator oscillates at a frequency determined by the time constant of a circuit formed by the resistor 39 and capacitor 38 and provides an oscillation output I. This output is coupled to the primary winding of the trigger transformer 17a of the switch driving circuit 17. The switch driving circuit 17 drives the triac 12a in synchronism to the oscillation output I. While the triac 12a is rendered conductive every time it receives a trigger pulse, it is triggered for every cycle of the AC power source. While each trigger pulse is present, the AC voltage is supplied to the triple voltage rectifier 13 and rectified to obtain a tripled voltage. This rectified voltage is coupled to the main capacitor 14. The main capacitor 14 is thus gradually charged from a time $T_1$ as shown in B in FIG. 4. By operating a camera shutter release button when the main capacitor has been completely charged, the trigger circuits 22 and 23 each deliver a trigger pulse in synchronism to the action of the X switch. While the flash tube 20 is caused to flash in response to these trigger signals, the voltage across the capacitor 14 begins to be reduced from a time $T_2$ of the flash starting. When the proper exposure is reached at a time $T_3$, a trigger pulse is delivered from the trigger circuit 27 to the quenching thyristor 26, whereby the main thyristor 21 is reversely biased by the voltage across the quenching capacitor 25. As a result, the main thyristor 21 is rendered non-conductive, thus terminating the flash radiation. At this time, i.e., the time $T_3$, the voltage across the main capacitor 14 is higher than the voltage across the capacitor 48, that is, the voltage at the juncture between the resistors 49 and 50 is higher than the voltage $V_4$ on the zener diode 56 as shown in E, and the output of the operational amplifier 58 is thus held at a L (low) level. Since at this time the photo-coupler 62 is inoperative, trigger pulses are continually supplied to the trigger transformer 17a as shown in G. Consequently, the main capacitor 14 begins to be charged again immediately after the time $T_3$ and is thus completely charged in a short period of time.

In case when the full flash radiation of the flash tube 20 is caused, the voltage across the capacitor 14 is caused to be sharply reduced from a time $T_4$ to reach the voltage $V_3$ across the capacitor 48 at a time $T_5$ as shown in B. When the voltage across the main capacitor 14 becomes lower than the voltage $V_3$, the charge in the capacitor 48 is caused to go through the diode 52 into the main capacitor 14, and thus the voltage across the capacitor 48 is reduced as shown in C. At this time, the voltage at the juncture between the capacitor 48 and resistor 49 and the juncture between the resistors 49 and 50 are reduced as shown in D and F respectively. When the voltage at the inverted input terminal of the operational amplifier 58 becomes lower than the voltage on the zener diode 56 with the voltage reduction described above, the output of the operational amplifier 58 goes to an H (high) level. As a result, the transistor 61 is triggered to cause energization of the photo-coupler 62 whereby the capacitor 38 is discharged through the phototransistor of the photo-coupler 62. With this discharge the oscillation of the oscillator circuit is stopped to render the triac 12a non-conductive, thus cutting power supply from the power source 11 to the rectifier 13. Thus, when the main capacitor 14 is discharged by the discharge blocking voltage at a time $T_6$, the flash tube 20 terminates its flash radiation without continuous discharge. The "off" state of the triac 12a is continued until a time $T_7$, at which a trigger pulse is given again to the trigger transformer 17a, whereupon the triac 12a is rendered conductive. In order to avoid the continuous discharge of the flash tube 20, it is necessary to inhibit application of voltage to the flash tube until the ionization of the gases within the flash tube 20 is over. This means that the H level period of the output of the operational amplifier 58 be longer than the ion extinction period, and this period is determined by the time constant of the circuit of the capacitor 48 and resistor 49. In a case where the voltage across the main capacitor 14 becomes lower than the voltage across the capacitor 48 so that the flash radiation is interrupted by light flash control, the voltages across the capacitors 14 and 48 are not reduced to the discharge blocking voltage, that is, the main capacitor 14 is slightly discharged. In this case, the voltage at the inverted input terminal of the operational amplifier 58 thus becomes lower than the voltage at the non-inverted input terminal in a shorter period of time, that is, the non-conduction period of the triac 12a is reduced, so that sooner recharging is possible.

Figure 3:
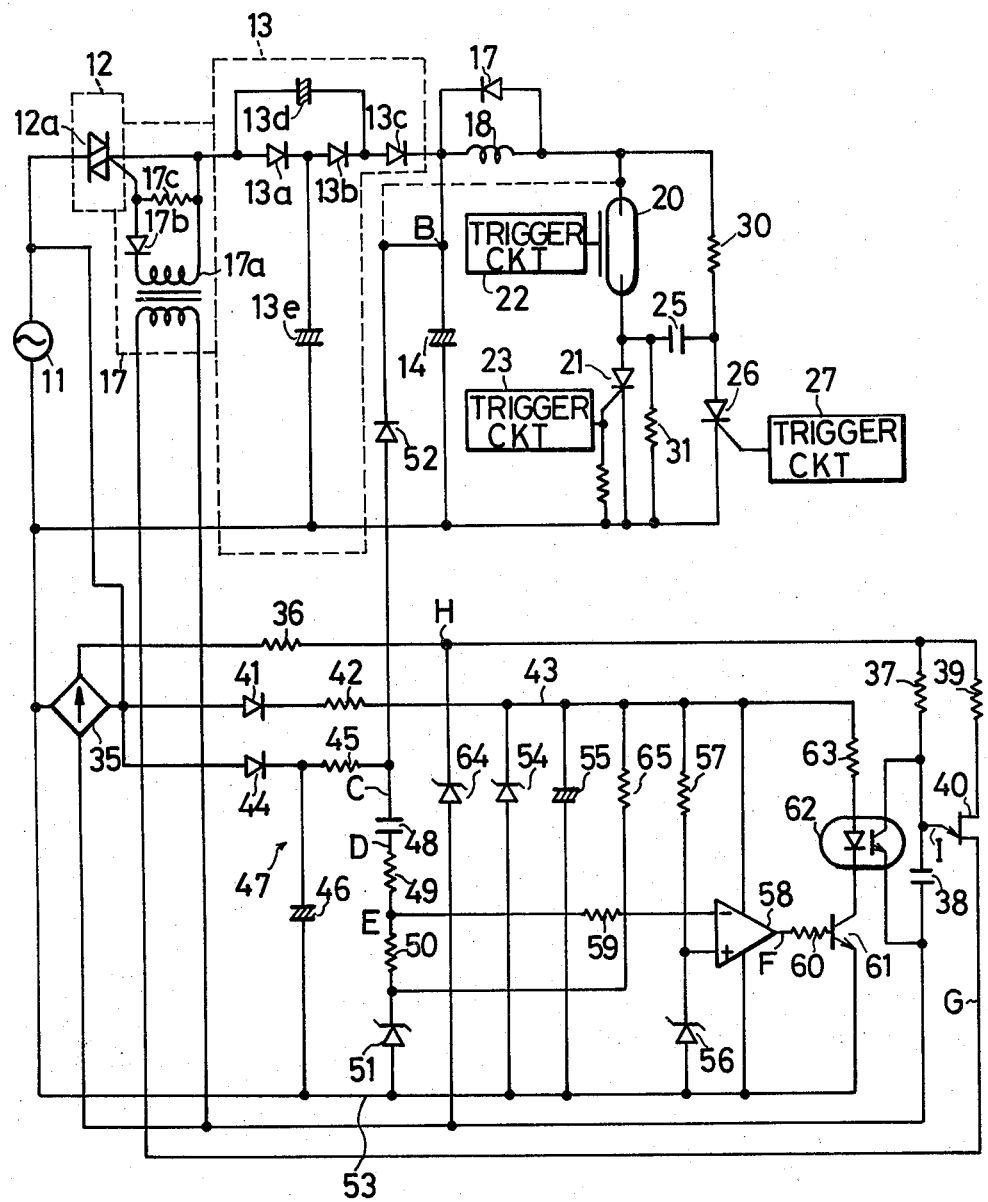
FIG. 3 is a circuit diagram showing a specific circuit of the electronic flash apparatus including a power source circuit.
Figure 6:
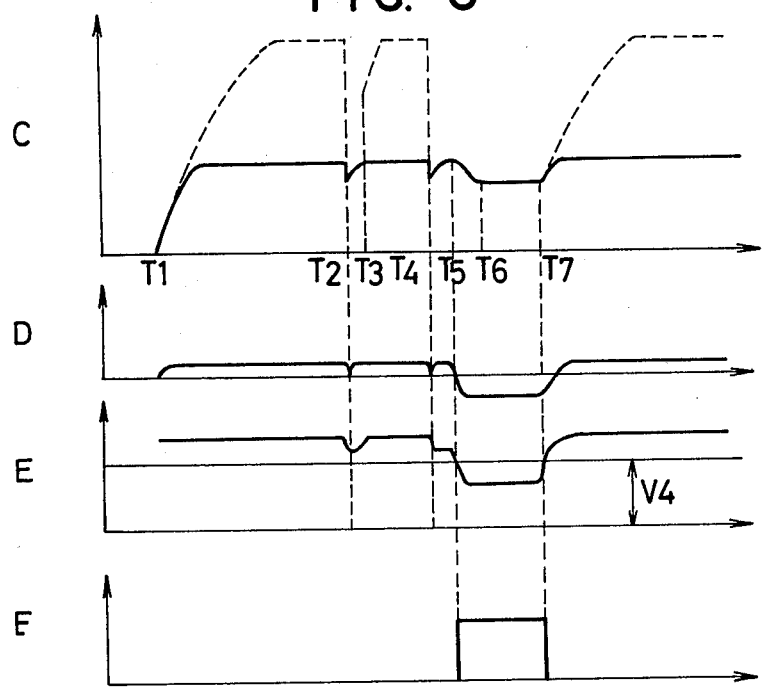
FIG. 6 is a waveform diagram showing waveforms appearing at certain parts of the circuit of FIG. 3 in the case when the voltage across the flash tube is detected.

While in the embodiment of FIG. 3 the voltage across the main capacitor 14 is detected, it is possible to detect the voltage on the flash tube 20 as shown by dashed line in FIG. 6. In this case, waveforms appearing at various parts are as shown in FIG. 6. Since in this case the voltage on the flash tube 20 is basically measured in the capacitor 48, the voltage across the capacitor 48 is momentarily reduced when the discharge of the flash tube is begun. This situation occurs at times $T_2$ and $T_4$ in FIG. 6. Shown by dashed line in C is the waveform of the voltage on the flash tube 20. The detection of the voltage across the main capacitor 14 and the detection of the voltage on the flash tube 20 are distinguished by whether the detected voltage is momentarily reduced at the commencement of the flash radiation; the latter case is different from the former case in that the voltage at the inverted input terminal of the operational amplifier 58 is slightly reduced at the times $T_2$ and $T_4$ as shown in E in FIG. 6. With the apparatus where the voltage on the flash tube is detected, the quenching circuit and continuous discharge prevention circuit can be operated with less power. This means that where these circuits are formed on a printed circuit board, the diode 52 and resistor 30 can be connected to the same terminal, so that it is possible to reduce the number of circuits involved and hence provide for improved operation control in manufacture.

Figure 7:
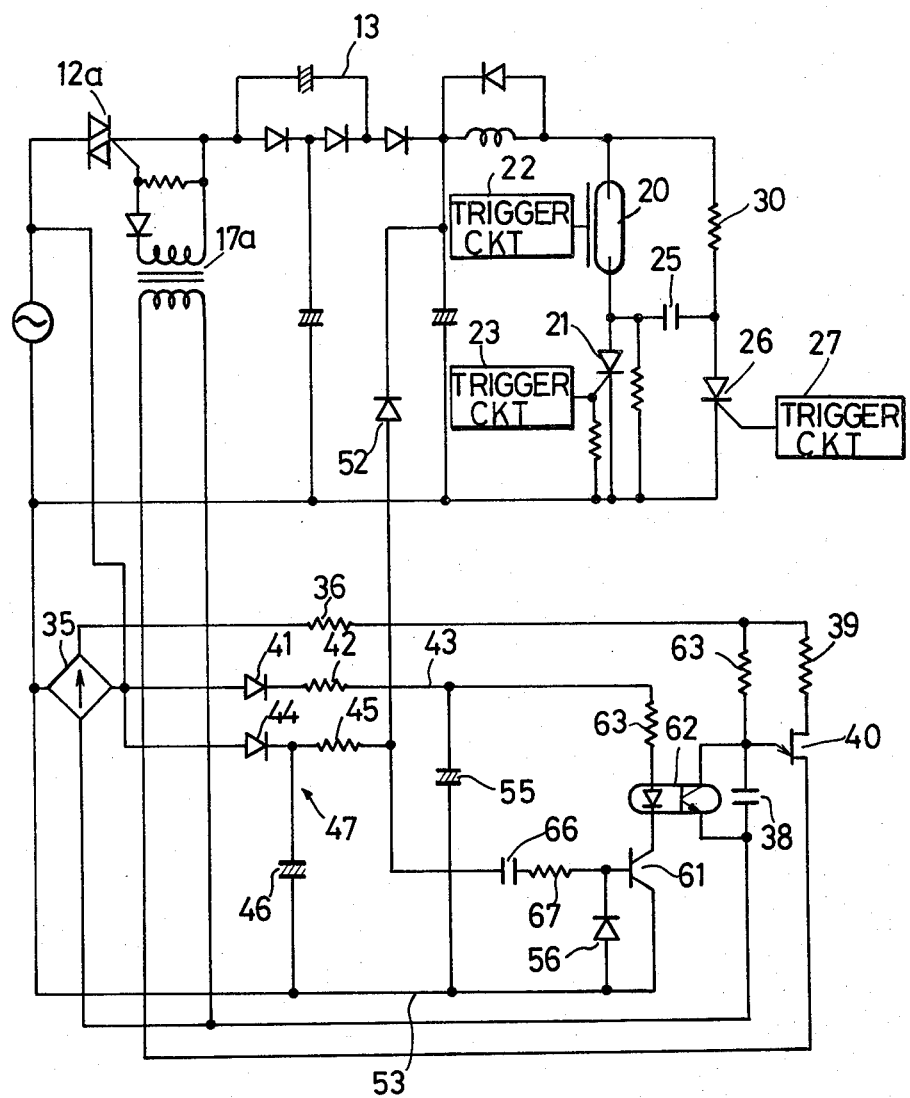
FIG. 7 is a circuit diagram showing an electronic flash apparatus including another embodiment of the power source circuit.

A different embodiment of the invention will now be described with reference to FIG. 7. In FIGS. 3 and 7, the same components are designated by the same reference numerals, and their detailed description is omitted. In this embodiment, the output side of the rectifier 47 is connected through a capacitor 66 and a resistor 67 to the base of the transistor 61. Also, the zener diode 56 is connected between the base and collector of the transistor 61.

Figure 8:
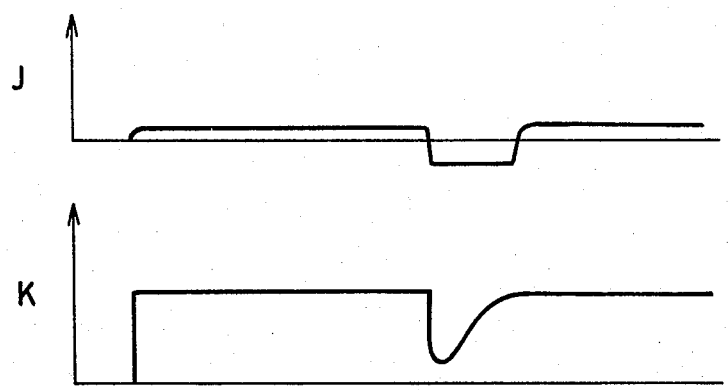
FIG. 8 is a waveform diagram showing waveforms appearing at certain parts of the circuit of FIG. 7.

In this embodiment, when the voltage on the flash tube 20 is brought into the continuous discharge voltage region, the voltage at the juncture between the capacitor 66 and resistor 67 is reduced as shown in J in FIG. 8. As a result, the transistor 61 is triggered to cause energization of the photo-coupler 62. Thus, the capacitor 38 is short-circuited by the photo-transistor of the photo-coupler 62 to stop the generation of trigger pulses, whereby the triac 12a is rendered non-conductive to cut off power supply from the charging circuit, i.e., power source circuit, to the discharging circuit. In this way, the continuous discharge is prevented. Shown in J in FIG. 8 is the base voltage on the transistor 68.

As has been described in the foregoing, according to the invention only when the voltage on the main capacitor or on the flash tube becomes lower than a predetermined value, a first switch element provided between the discharging circuit including the main capacitor and the charging circuit including the power source is opened to prevent the flash tube from proceeding to the continuous discharge, and it is held "on" while the aforementioned voltage is held above the predetermined value because the flash radiation of the flash tube is interrupted by a second switch element between the flash tube and main capacitor. Thus, the charging time required can be shorted compared to the prior art apparatus where a first switch such as mentioned above is always opened when the flash tube discharge is caused, so that the likelihood of missing a shutter chance as in the prior art photographing can be eliminated, which is very beneficial in the electronic flash photographing.

What is claimed is:

1. An electronic flash apparatus comprising:
   an electronic flash tube;
   a main capacitor for supplying discharge energy to said electronic flash tube;
   a power source circuit connected to said electronic flash tube and to said main capacitor, for charging said main capacitor;
   a voltage detecting circuit for detecting the voltage on said flash tube or said main capacitor;
   control signal generating means for generating an output signal when the detection voltage of said voltage detecting circuit reaches a discharge continuous voltage, at which time said flash tube is continuously discharged; and
   switch means provided in said power source circuit, for inhibiting the power supply from said power supply circuit to said main capacitor and flash tube in response to the output signal from said control signal generating means for a predetermined period of time.

2. An electronic flash apparatus according to claim 1, wherein said power source circuit includes an AC power source, said switch means being connected to said AC power source, and a multiple voltage rectifying circuit for multiple voltage rectifying an AC input supplied from said power source through said switch means.

3. An electronic flash apparatus according to claim 1 or 2, wherein said switch means includes a switching element and a switching element driving circuit for driving said switching element.

4. An electronic flash apparatus according to claim 1, wherein said switch means includes a switching element, a pulse transformer for supplying drive pulses to said switching element and a pulse oscillator circuit for supplying input pulses to said pulse transformer, said pulse oscillator circuit being held inoperative for a predetermined period of time according to the output signal from said control signal generating means.

5. An electronic flash apparatus according to any one of claims 1, 2 or 4, wherein said voltage detecting circuit includes a time constant circuit having a time constant corresponding to a power cut-off period of said switch means and providing an output voltage varying with the voltage on said flash tube or said main capacitor, and also wherein said control signal generating means includes means for comparing the output voltage of said time constant circuit and a reference voltage.

6. An electronic flash apparatus according to claim 5, wherein said comparing means comprises an operational amplifier.

7. An electronic flash apparatus according to claim 5, wherein said comparing means comprises a zener diode connected to said time constant circuit.

* * * * *